(12) United States Patent
Miyake

(10) Patent No.: US 12,715,228 B2
(45) Date of Patent: Aug. 25, 2026

(54) INKJET RECORDING METHOD AND PRINTED MEDIUM

(71) Applicant: BROTHER KOGYO KABUSHIKI KAISHA, Nagoya (JP)

(72) Inventor: Yuho Miyake, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/097,010

(22) Filed: Apr. 1, 2025

(65) Prior Publication Data

US 2025/0303751 A1 Oct. 2, 2025

(30) Foreign Application Priority Data

Apr. 2, 2024 (JP) ................................ 2024-059322

(51) Int. Cl.
*B32B 3/14* (2006.01)
*B32B 3/16* (2006.01)
*B41J 11/00* (2006.01)
*C09D 11/30* (2014.01)

(52) U.S. Cl.
CPC ............... *B41J 11/002* (2013.01); *B32B 3/14* (2013.01); *B32B 3/16* (2013.01); *C09D 11/30* (2013.01)

(58) Field of Classification Search
CPC .. B32B 3/14; B32B 3/16; C09D 11/30; C09D 11/38
See application file for complete search history.

(56) References Cited

U.S. PATENT DOCUMENTS 5,609,671 A 3/1997 Nagasawa
5,837,045 A 11/1998 Johnson et al.
2006/0201380 A1 9/2006 Kowalski et al.
2007/0100023 A1 5/2007 Burns et al.
2007/0100024 A1 5/2007 Gu et al.
2009/0229489 A1 9/2009 Gu
2010/0103236 A1 4/2010 Komatsu
2018/0118965 A1 5/2018 Tabuchi et al.
2018/0127610 A1 5/2018 Kido et al.

FOREIGN PATENT DOCUMENTS

JP H08-3498 A 1/1996
JP 2000513396 A 10/2000
JP 2008524400 A 7/2008
JP 2009515007 A 4/2009
JP 2011515535 A 5/2011
JP 2014008639 A 1/2014
JP 2017088706 A 5/2017
JP 2023054437 A 4/2023

*Primary Examiner* — Elizabeth E Mulvaney
(74) *Attorney, Agent, or Firm* — Element IP, PLC

(57) ABSTRACT

An inkjet recording method may include: ejecting ink under a first condition; and drying the ink under a second condition. An Sal may be 5 nm or less in 80% or more of a plurality of first partial regions. The first condition may include: (1) using the ink that comprises resin particles having a Tg of 50° C. or higher, an organic solvent, and water, wherein the ink comprises the resin particles in 5 mass % or more and 11 mass % or less. The first condition and the second condition may be conditions that satisfy: (2) in a case where a ratio of an amount of ejected ink to an amount of remaining ink after the drying is 1:0.05 to 0.15, an Sdr is 6% or less in 80% or more of a plurality of second partial regions when the amount of ejected ink is 1 mg/cm$^2$.

14 Claims, 1 Drawing Sheet

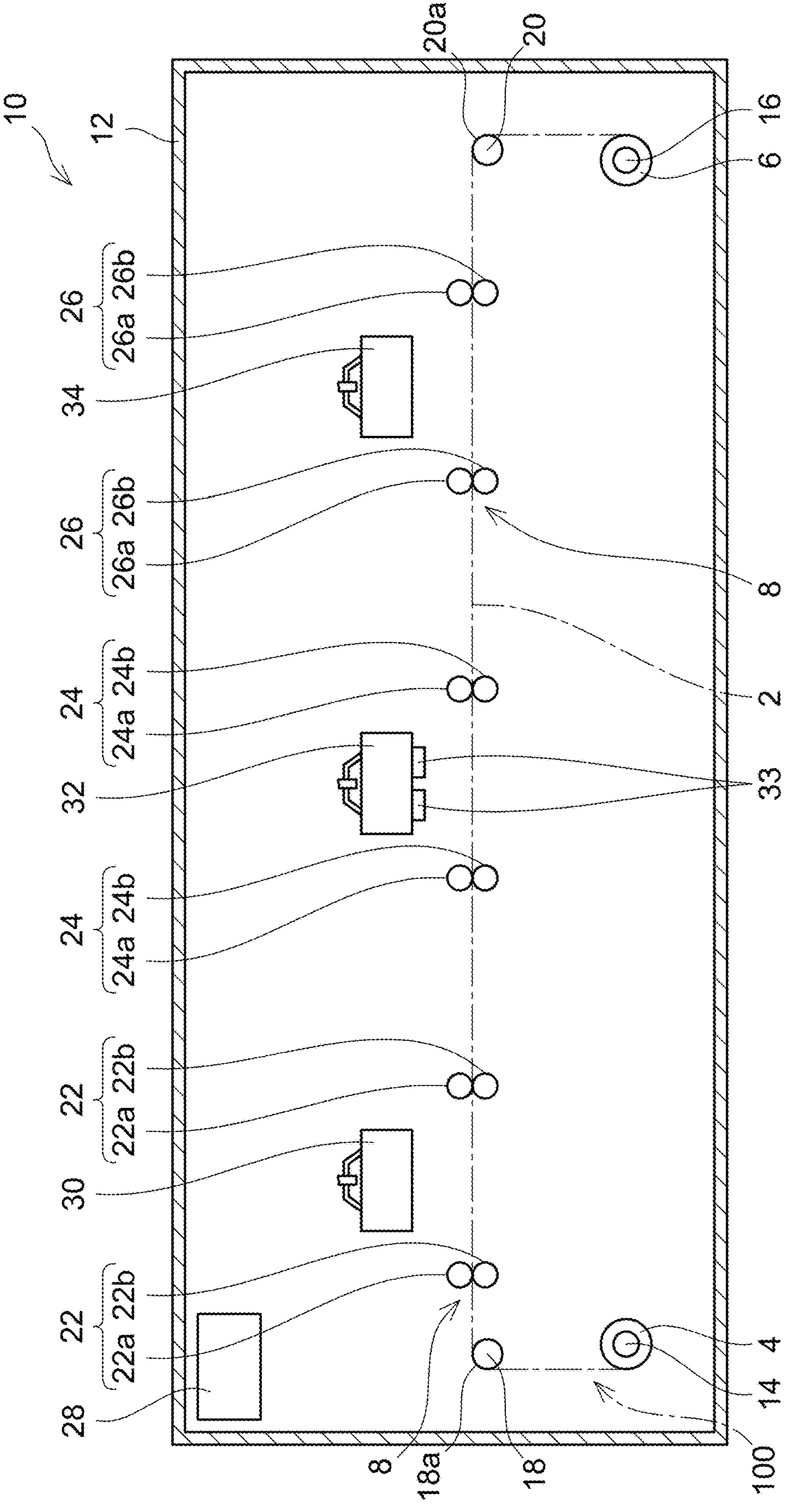
10
12
20a
20
16
6
26
26a
26b
34
8
2
24
24a
24b
32
33
22
22a
22b
30
28
4
14
18a
18
100

INKJET RECORDING METHOD AND PRINTED MEDIUM

REFERENCE TO RELATED APPLICATION

This application claims priority to Japanese Patent Application No. 2024-059322 filed on Apr. 2, 2024. The entire content of the priority application is incorporated herein by reference.

BACKGROUND ART

Technologies for recording images on coated paper, which is low-absorbent medium, using resin particles-containing ink are known.

SUMMARY

The disclosure herein provides a technology for achieving a printed medium with superior rub fastness and glossiness as a result of an image being printed on a low-absorbent medium according to an inkjet recording scheme.

An inkjet recording method is disclosed herein. The inkjet recording method may comprise ejecting ink onto a surface of a medium under a first condition; and drying the ink by heating the medium under a second condition after the ejecting. An arithmetic mean height Sa1 may be 5 nm or less in 80% or more of a plurality of first partial regions randomly selected from the surface of the medium. The first condition may include: (1) using the ink that comprises resin particles having a glass transition temperature Tg of 50° C. or higher, an organic solvent, and water, wherein the ink comprises the resin particles in 5 mass % or more and 11 mass % or less. The first condition and the second condition may be conditions that satisfy: (2) in a case where a ratio of an amount of ejected ink to an amount of remaining ink after the drying is 1:0.05 to 0.15, a developed area ratio Sdr is 6% or less in 80% or more of a plurality of second partial regions randomly selected from an ink adhering region on the surface of the medium when the amount of ejected ink is 1 mg/cm$^2$.

This inkjet recording method allows for formation of a coating film having a relatively small developed area ratio. Thus, this recording method can achieve a printed medium with superior rub fastness and glossiness.

A printed medium obtained by ejecting ink onto a surface of a medium is also novel and useful. In the printed medium: (1) an arithmetic mean height Sa1 may be 5 nm or less in 80% or more of a plurality of first partial regions randomly selected from a non-ink-adhering region on the surface of the medium; and (2) a developed area ratio Sdr may be 6% or less in 80% or more of a plurality of second partial regions randomly selected from an ink adhering region on the surface of the medium when an amount of ejected ink is 1 mg/cm$^2$.

BRIEF DESCRIPTION OF DRAWING

FIG. 1 is a drawing showing a configuration of an image recording apparatus 10.

DESCRIPTION (Configuration of Image Recording Apparatus 10)

Referring to the drawing, an image recording apparatus 10 according to an embodiment is described. The image recording apparatus 10 ejects ink onto a sheet 2 and records images on the sheet 2 using an inkjet recording scheme. The image recording apparatus 10 is used on a desk. However, in another embodiment, the image recording apparatus 10 may be used on a floor or on a rack, and may be small or large in size.

As shown in FIG. 1, the image recording apparatus 10 comprises a housing 12, a first holder 14, a second holder 16, a first tensioner 18, a second tensioner 20, two pairs of first rollers 22, two pairs of second rollers 24, two pairs of third rollers 26, and a controller 28. The controller 28 is communicably connected to respective units of the image recording apparatus 10 and controls operations of the respective units. It should be noted that components are not necessarily located as shown in the drawing. One or more of the components (e.g., the second holder 16) may be located outside the housing 12.

The first holder 14 supports a first roll 4 which is a rolled sheet 2. The sheet 2 is a long sheet. The first holder 14 is rotated by a feed motor (not shown). The first roll 4 supported by the first holder 14 is rotated with the rotation of the first holder 14.

The first tensioner 18 is located above the first holder 14. The first tensioner 18 comprises an outer surface 18*a* with which the sheet 2 makes contact. After withdrawn from the roll 4, the sheet 2 is curved along the outer surface 18*a* and directed in a downstream direction (especially to the right in FIG. 1).

Each of the two pairs of first rollers 22 comprises a first feed roller 22*a* and a first pinch roller 22*b*. A nip 8 is formed between each of the first feed rollers 22*a* and its corresponding first pinch roller 22*b* upon when these rollers 22*a* and 22*b* come into contact. In an up-down direction, the nips 8 are located substantially at the same position as the upper end of the outer surface 18*a* of the first tensioner 18. The two pairs of first rollers 22 are rotated by the feed motor (not shown). The two pairs of first rollers 22 are rotated while nipping the sheet 2, thereby sending the sheet 2 from the first tensioner 18 in the downstream direction. The number and positions of the pairs of first rollers 22 are not particularly limited.

Each of the two pairs of second rollers 24 comprises a second feed roller 24*a* and a second pinch roller 24*b*. A nip 8 is formed between each of the second feed rollers 24*a* and its corresponding second pinch roller 24*b* upon when these rollers 24*a* and 24*b* come into contact. In the up-down direction, the nips 8 are located substantially at the same position as the upper end of an outer surface 20*a* of the second tensioner 20. The two pairs of second rollers 24 are rotated by the feed motor (not shown). The two pairs of second rollers 24 are rotated while nipping the sheet 2, thereby sending the sheet 2 in the downstream direction. The number and positions of the pairs of second rollers 24 are not particularly limited.

Each of the two pairs of third rollers 26 comprises a third feed roller 26*a* and a third pinch roller 26*b*. A nip 8 is formed between each of the third feed rollers 26*a* and its corresponding third pinch roller 26*b* when these rollers 26*a* and 26*b* come into contact. In the up-down direction, the nips 8 are located substantially at the same position as the upper end of the outer surface 18*a* of the first tensioner 18. The two pairs of third rollers 26 are rotated by the feed motor (not shown). The two pairs of third rollers 26 are rotated while nipping the sheet 2, thereby sending the sheet 2 toward the second tensioner 20. The number and positions of the pairs of third rollers 26 are not particularly limited.

The second tensioner 20 is located above the second holder 16. The second tensioner 20 comprises the outer surface 20*a* with which the sheet 2 makes contact. The sheet 2 from the pairs of third rollers 26 is curved along the outer surface 20*a* and directed downward.

The second holder 16 supports a second roll 6. The second holder 16 is rotated by the feed motor (not shown). The second roll 6 supported by the second holder 16 is rotated with the rotation of the second holder 16, thereby rolling the sheet 2 with an image recorded thereon.

The sheet 2 follows a path 100 from the first holder 14 to the second holder 16. An image is recorded on the sheet 2 while the sheet 2 is following this path 100.

As shown in FIG. 1, the image recording apparatus 10 further comprises a surface treatment device 30, a head 32, and a drying device 34.

The surface treatment device 30 is located above the path 100. The surface treatment device 30 provides surface treatment to the sheet 2. In this embodiment, the surface treatment device 30 provides surface treatment to a surface of the sheet 2 (i.e., the print side of the sheet 2, which is shown as the upper surface in FIG. 1) by corona discharge. This surface treatment improves the surface tension of the sheet 2 and the wettability of the surface of the sheet 2, and thus improves the adherability of ink to the sheet 2. The surface treatment device 30 is not limited to the device described above. For example, the surface treatment device 30 may radiate plasma to the sheet 2 to improve the wettability of the surface of the sheet 2 by modifying the quality of the surface of the sheet 2.

The head 32 is located downstream of the surface treatment device 30. The head 32 comprises a plurality of nozzles 33. When piezoelectric elements (not shown) corresponding to the respective nozzles 33 are activated, the ink from an ink tank (not shown) is ejected through the nozzles 33 to the outside. Thus, an image is recorded on the surface of the sheet 2 by the nozzles 33 ejecting the ink onto the surface of the sheet 2 (i.e., onto the print side of the sheet 2, which is shown as the upper surface in FIG. 1). The number and positions of the nozzles 33 are not particularly limited.

The drying device 34 is located downstream of the head 32. For example, the drying device 34 is a dryer, a heat gun, or an oven. The drying device 34 can dry the ink on the surface of the sheet 2 (i.e., on the print side of the sheet 2, which is shown as the upper surface in FIG. 1) by heating the surface of the sheet 2.

(Sheet 2)

The surface of the sheet 2 (i.e., the print side of the sheet 2, which is shown as the upper surface in FIG. 1) is characterized by having an arithmetic mean height Sa1 of 5 nm or less in 80% or more of a plurality of randomly selected partial regions (e.g., ten partial regions) (e.g., 1 μm×1 μm each). This means that the sheet 2 is a so-called low-absorbent medium having relatively high surface smoothness and low absorbency for liquids such as ink, treatment liquids, etc. Examples of the material of the sheet 2 that satisfies the above arithmetic mean height Sa1 include, for example, plastics such as polyvinyl chloride (PVC), polyethylene terephthalate (PET), polycarbonate, polystyrene, polyurethane, polyethylene, and the like. The sheet 2 may be any medium as long as it satisfies the above arithmetic mean height Sa1. For example, the sheet 2 may be a substrate (e.g., paper) coated with one or more of the above-mentioned plastics. The above-mentioned materials basically satisfy the arithmetic mean height Sa1 but may sometimes fail to satisfy the arithmetic mean height Sa1 due to manufacturing errors, etc. Thus, the technology disclosed herein can use any sheets that satisfy the above arithmetic mean height Sa1 from among sheets having their print sides constituted of the above-mentioned materials. Further, the technology disclosed herein can use any materials other than the above-mentioned materials, if desired, as long as they satisfy the above arithmetic mean height Sa1.

(Ink)

The ink comprises resin particles, a pigment, an organic solvent, and water. However, the ink may not comprise any pigments. The ink is an aqueous ink for inkjet recording in which the resin particles, the pigment, and the organic solvent are dissolved or dispersed in water.

(Resin Particles)

The resin particles are contained in the ink to fix solid components (e.g., the pigment, etc.) in the ink to a medium surface and improve the fixability. The resin particles melt during drying of the ink and the melted resin particles join together, thereby forming a coating film of the resin particles on the medium surface during drying of the ink.

As the resin particles, for example, resin particles comprising at least one of methacrylic acid and acrylic acid as monomer can be used. For example, commercially available resin particles may be used as the resin particles. The resin particles may further comprise, for example, styrene, vinyl chloride, etc. as monomer. The resin particles may be included in, for example, an emulsion. For example, the emulsion is constituted of the resin particles and a dispersion medium (e.g., water, etc.). The resin particles are not dissolved in the dispersion medium but are dispersed in the dispersion medium while having particle diameters within a predetermined range. Examples of the resin particles include, for example, acrylic acid resins, maleate ester resins, vinyl acetate resins, carbonate resins, polycarbonate resins, styrene resins, ethylene resins, polyethylene resins, propylene resins, polypropylene resins, urethane resins, polyurethane resins, polyester resins, copolymer resins thereof, and the like. Only one kind of resin particles may be used, or two or more kinds of resin particles may be used together.

As the resin particles, a resin having a glass transition temperature (Tg) of 50° C. or higher is used. The lower limit of the glass transition temperature (Tg) is, for example, 60° C., 65° C., or 70° C. The upper limit of the glass transition temperature (Tg) is not particularly limited, but it is, for example, 100° C., 90° C., 85° C., or 80° C. An above-mentioned upper limit and an above-mentioned lower limit can be combined as desired to set a range of the glass transition temperature Tg. For example, the range of the glass transition temperature Tg is from 50° C. to 100° C., from 60° C. to 90° C., from 65° C. to 85° C., or from 70° C. to 80° C. The glass transition temperature Tg of 50° C. or higher allows the ink coating film to have favorable robustness after the ink has been dried, allowing for recording of an image with superior rub fastness.

As the emulsion, for example, a commercially available emulsion may be used. Examples of the commercially available emulsion include, for example, "SUPERFLEX (registered trademark) 870" (Tg: 78° C.) manufactured by DKS Co. Ltd., "Mowinyl (registered trademark) 6969D" (Tg: 71° C.) manufactured by Japan Coating Resin Corporation, "Takelac (registered trademark) W-5661" (Tg: 70° C.) manufactured by Mitsui Chemicals, Inc., "KT-8803" (Tg: 65° C.) manufactured by Unitika Ltd., "PESRESIN A-647GEX" (Tg: 60° C.) manufactured by Takamatsu Oil & Fat Co., Ltd., "Hirose-X (registered trademark) KE-1062" (Tg: 112° C.) and "Hirose-X (registered trademark) QE-1042" (Tg: 69° C.) manufactured by Seikou PMC Co., Ltd. and the like.

The average particle diameter of the resin particles is not particularly limited, but it is, for example, in a range of 5 nm or more to 500 nm or less, in a range of 20 nm or more to 300 nm or less, or in a range of 30 nm or more to 100 nm or less. The average particle diameter can be measured as an arithmetic mean diameter, for example, using a dynamic-light-scattering particle diameter distribution measuring device "LB-550" manufactured by HORIBA, Ltd.

A content of the resin particles relative to the overall amount of the ink is in a range of 5 mass % or more to 11 mass % or less. For example, the lower limit of the content is 5.5 mass %, 6 mass %, 6.5 mass %, or 7 mass %. For example, the upper limit of the content is 10.5 mass %, 10 mass %, 9.5 mass %, or 9 mass %. An above-mentioned upper limit and an above-mentioned lower limit can be combined as desired to set a range of the content. For example, the range of the content is from 5.5 mass % or more to 10.5 mass % or less, from 6 mass % or more to 10 mass % or less, from 6.5 mass % or more to 9.5 mass % or less, or from 7 mass % or more to 9 mass % or less. The content of the resin particles being 5 mass % or more allows solid components (e.g., the pigment) in the ink to be stably fixed to a medium surface, while the content of the resin particles being 11 mass % or less allows for improvements in the glossiness of the ink coating film and the preservation stability of the ink after the ink has been dried.

(Pigment)

The pigment is not particularly limited, and examples of the pigment include, for example, carbon black, inorganic pigments, organic pigments, and the like. Examples of the carbon black include, for example, furnace black, lampblack, acetylene black, channel black, and the like. Examples of the inorganic pigments include, for example, titanium oxide, iron oxide inorganic pigments, and carbon black inorganic pigments, and the like. Examples of the organic pigments include, for example, azo pigments such as azo lake pigments, insoluble azo pigments, condensed azo pigments, chelate azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; lake pigments such as basic lake pigments and acidic lake pigments; nitro pigments; nitroso pigments; aniline black daylight fluorescent pigments, and the like. Other pigments can be used as long as they are dispersible in aqueous phase. Specific examples of such pigments include, for example, C. I. Pigment Black 1, 6, and 7; C. I. Pigment Yellow 1, 2, 3, 12, 13, 14, 15, 16, 17, 55, 74, 78, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violet 19 and 196; C. I. Pigment Blue 1, 2, 3, 15, 15:1, 15:2, 15:3, 15:4, 16, 22, and 60; C. I. Pigment Green 7 and 36; solid solutions of these pigments, and the like. In the ink, the pigment may be dispersed in water by a dispersant. As the dispersant, for example, a general polymer dispersant (resin for pigment dispersion, resin dispersant) or the like or a laboratory-developed dispersant may be used. Alternatively, the pigment may be encapsulated by polymer in the ink.

An example of a pigment dispersion method using a resin for pigment dispersion involves, for example, dispersing a pigment by a disperser. The disperser used for pigment dispersion is not particularly limited as long as it is generally available. Examples of such a disperser include, for example, ball mills, roll mills, sand mills (e.g., rapid sand mills), and the like.

The pigment may be a self-dispersion pigment. The self-dispersion pigment is a pigment in which a hydrophilic functional group, such as a carbonyl group, hydroxy group, carboxylic acid group, sulfonic acid group, phosphate group, or the like, and at least one of salts thereof are incorporated directly or via another functional group in pigment particles by chemical bonding, and it is dispersible in water without use of a dispersant. A pigment processed according to a method described, for example, in Japanese Patent Application Publication No. H08-3498, Japanese Patent Application Publication No. 2000-513396, Japanese Patent Application Publication No. 2008-524400, Japanese Patent Application Publication No. 2009-515007, or Japanese Patent Application Publication No. 2011-515535 can be used as the self-dispersion pigment. An inorganic pigment and an organic pigment both can be used as a material of the self-dispersion pigment. Examples of pigments suitable for the above-mentioned processing include, for example, carbon black such as "MA8" and "MA100" manufactured by Mitsubishi Chemical Corporation and the like. For example, a commercially available self-dispersion pigment may be used as the self-dispersion pigment. Examples of such a commercially available self-dispersion pigment include, for example, "CAB-O-JET (registered trademark) 200", "CAB-O-JET (registered trademark) 250C", "CAB-O-JET (registered trademark) 260M", "CAB-O-JET (registered trademark) 270Y", "CAB-O-JET (registered trademark) 300", "CAB-O-JET (registered trademark) 400", "CAB-O-JET (registered trademark) 450C", "CAB-O-JET (registered trademark) 465M", and "CAB-O-JET (registered trademark) 470Y" manufactured by Cabot Corporation; "BONJET (registered trademark) BLACK CW-2" and "BONJET (registered trademark) BLACK CW-3" manufactured by Orient Chemical Industries Co., Ltd.; "LIOJET (registered trademark) WD BLACK 002C" manufactured by Toyo Ink MFG, Co., Ltd, and the like.

Only one kind of pigment may be used, or two or more kinds of pigments may be used together. A content of solid components of the pigment (pigment solid components) relative to the overall amount of the ink is not particularly limited and may be determined as desired to achieve desired optical density, colorfulness, or the like. For example, the content of the pigment solid components is in a range of 0.1 mass % or more to 20 mass % or less, in a range of 1 mass % or more to 10 mass % or less, or in a range of 2 mass % or more to 8 mass % or less. The content of the pigment solid components represents only the mass of the pigment but does not include the mass of the resin dispersant and the like (i.e., conversion based on active ingredients amount).

(Organic Solvent)

The organic solvent is not particularly limited, and any organic solvent can be used. Examples of the organic solvent include, for example, propylene glycol; dipropylene glycol; tripropylene glycol; 1,3-propanediol; ethylene glycol; 1,2-butanediol; propylene glycol monobutyl ether; dipropylene glycol monopropyl ether; triethylene glycol monobutyl ether; 1,2-hexanediol; 1,6-hexanediol, and the like and glycol ether with propylene oxide group. Other examples of the organic solvent include, for example, alkyl alcohols with carbon number of 1 to 4 such as methyl alcohol, ethyl alcohol, n-propyl alcohol, isopropyl alcohol, n-butyl alcohol, sec-butyl alcohol, tert-butyl alcohol, and the like. Yet other examples of the organic solvent include, for example, alkylene glycols with alkylene groups including carbon number of 2 to 6 such as ethylene glycol; propylene glycol; butylene glycol; triethylene glycol; 1,2,6-hexanetriol; thiodiglycol; hexylene glycol; diethylene glycol, and the like. Still other examples of the organic solvent include, for example, lower alkyl ethers of alkylene glycols such as glycerin, ethylene glycol monomethyl (or ethyl, propyl, butyl) ether, diethylene glycol monomethyl (or ethyl, propyl, butyl) ether, triethylene glycol monomethyl (or ethyl, propyl, butyl) ether, tetraethylene glycol monomethyl (or ethyl, propyl, butyl) ether, propylene glycol monomethyl (or ethyl, propyl, butyl) ether, dipropylene glycol monomethyl (or ethyl, propyl, butyl) ether, propylene glycol monopropyl ether, dipropylene glycol monopropyl ether, tripropylene glycol monomethyl (or ethyl, propyl, butyl) ether, tetrapropylene glycol monomethyl (or ethyl) ether, and the like. Yet other examples of the organic solvent include N-methyl-2-pyrrolidone, 2-pyrrolidone, 1,3-dimethyl-2-Imidazolidinone, and the like.

Among the examples listed above, a solvent that has a vapor pressure of 150 Pa or less at 25° C. is suitably used as the organic solvent. Such an organic solvent having vapor pressure of 150 Pa or less at 25° C. allows the organic solvent to vaporize at a moderate rate during drying of the ink and thus facilitates the melting of resin by the remaining organic solvent, allowing the melted resin particles to substantially evenly spread over the medium surface and a coating film with high smoothness to be formed. However, a solvent that has a vapor pressure exceeding 150 Pa at 25° C. may be used as the organic solvent.

A content of the organic solvent relative to the overall amount of the ink is not particularly limited. The lower limit of the content is, for example, 0.1 mass %, 0.5 mass %, 1 mass %, 3 mass %, or 5 mass %. The upper limit of the content is, for example, 30 mass %, 20 mass %, 15 mass %, 10 mass %, or 7 mass %. An above-mentioned upper limit and an above-mentioned lower limit can be combined as desired to set a range of the content. For example, the range is from 0.1 mass % or more to 30 mass % or less, from 0.5 mass % or more to 20 mass % or less, from 1 mass % or more to 15 mass % or less, from 3 mass % or more to 10 mass % or less, or from 5 mass % or more to 7 mass % or less.

(Water)

Water may be ion-exchange water or pure water. A content of water relative to the overall amount of the ink is determined as desired to achieve desired ink properties and the like.

The content of water is, for example, in a range of 15 mass % or more to 95 mass % or less or in a range of 25 mass % or more to 85 mass % or less. For example, the content of water may be the remainder (residual balance) of the overall amount of the ink excluding the other components.

(Other Components)

The ink may further comprise a surfactant. The surfactant is not particularly limited and can be selected as desired according to purposes. For example, a commercially available surfactant may be used. Specifically, examples of the surfactant include silicon-based surfactants, acetylene-based surfactants, and the like. Especially, using a silicon-based surfactant as the surfactant allows for a reduction in formation of VOC (volatile organic compounds) because silicon-based surfactants do not contain impurities such as ethylene oxide and the like.

Examples of commercially available silicon-based surfactants include, for example, "SILFACE (registered trademark) SAG002", "SILFACE (registered trademark) SAG005", and "SILFACE (registered trademark) SAG503A" manufactured by Nissin Chemical Industry Co., Ltd., and the like.

Examples of commercially available acetylene-based surfactants include, for example, "OLFINE (registered trademark) E1004", "OLFINE (registered trademark) E1008", and "OLFINE (registered trademark) E1010" manufactured by Nissin Chemical Industry Co., Ltd.; "SURFYNOL (registered trademark) 440", "SURFYNOL (registered trademark) 465", and "SURFYNOL (registered trademark) 485" manufactured by Air Products and Chemicals, Inc.; "ACETYLENOL (registered trademark) E40" and "ACETYLENOL (registered trademark) E100" manufactured by Kawaken Fine Chemicals Co., Ltd., and the like.

The ink may comprise another surfactant in addition to/instead of the silicon-based surfactant or acetylene-based surfactant. Examples of the other surfactant include, for example, nonionic surfactants "EMULGEN (registered trademark)" series, "RHEODOL (registered trademark)" series, "EMASOL (registered trademark)" series, "EXCEL (registered trademark)" series, "EMANON (registered trademark)" series, "AMIET (registered trademark)" series, and "AMINON (registered trademark)" series manufactured by Kao Corporation; a nonionic surfactant "SORBON (registered trademark)" series manufactured by Toho Chemical Industry Co., Ltd.; nonionic surfactants "DOBANOX (registered trademark)" series, "LEOCOL (registered trademark)" series, "LEOX (registered trademark)" series, "LAOL, LEOCOL (registered trademark)" series, "LIONOL (registered trademark)" series, "CADENAX (registered trademark)" series, "LIONON (registered trademark)" series, and "LEOFAT (registered trademark)" series manufactured by Lion Corporation; anion surfactants "EMAL (registered trademark)" series, "LATEMUL (registered trademark)" series, "VENOL (registered trademark)" series, "NEOPELEX (registered trademark)" series, NS SOAP, KS SOAP, OS SOAP, and "PELEX (registered trademark)" series manufactured by Kao Corporation; anion surfactants "LIPOLAN (registered trademark)" series, "LIPON (registered trademark)" series, "SUNNOL (registered trademark)" series, "LIPOTAC (registered trademark) TE, ENAGICOL" series, "LIPAL (registered trademark)" series, and "LOTAT (registered trademark)" series manufactured by Lion Corporation; cationic surfactants "CATIOGEN (registered trademark) ES-OW" and "CATIOGEN (registered trademark) ES-L" manufactured by DKS Co. Ltd., and the like.

Only one kind of surfactant may be used, or two or more kinds of surfactants may be used together. A content of the surfactant relative to the overall amount of the ink can be selected as desired according to purposes. For example, the content is in a rage of 0.1 mass % or more to 5 mass % or less, in a range of 0.5 mass % or more to 3.5 mass % or less, or in a range of 1 mass % or more to 3 mass % or less.

The ink may further comprise a generally known additive, if needed. Examples of such an additive include, for example, pH adjusters, viscosity modifiers, surface-tension modifiers, fungicides, and the like. Examples of the viscosity modifiers include, for example, polyvinyl alcohols, celluloses, water-soluble resins, and the like.

For example, the ink can be prepared by homogeneously mixing the resin particles, the pigment, the organic solvent, water, and optionally an additive by a generally known method and removing undissolved residue by a filter and/or the like.

(Hansen Solubility Parameter Distance between Organic Solvent and Resin Particles)

Here, a Hansen solubility parameter (HSP) distance between the above-described organic solvent and resin particles is described. HSP involve energy from dispersion forces between molecules, energy from dipolar intermolecular forces between molecules, and energy from hydrogen bonds between molecules. HSP is obtained as the sum of vectors for these three energies and is plotted in a three-dimensional space (the Hansen space) defined by coordinate axes for these three parameters. HSPs of substances are available from, for example, publicly known databases. Also, HSPs can be calculated using software such as HSPiP or the like. An HSP distance is a distance between HSPs of two substances in the above-mentioned three-dimensional space. The smaller an HSP distance is between two substances, the more likely they are to dissolve into each other. In this embodiment, an HSP distance between the organic solvent and the resin particles may be 1 or more and 5 or less. The HSP distance of 1 or more and 5 or less means that the organic solvent and the resin particles are moderately dissolvable into each other, ensuring the preservation stability of the ink and favorable formation of a coating film of the resin particles. The HSP distance may be 2 or more and 4 or less. However, the HSP distance between the organic solvent and the resin particles is not particularly limited, and it may be less than 1 or more than 5.

(Inkjet Recording Method)

Here, an inkjet recording method using the image recording apparatus 10 is described. This recording method comprises a surface treatment step, an ejection step, a drying step, and a pressure application step. The controller 28 controls relevant units of the image recording apparatus 10 to cause the units to perform these steps, for example, when an external instruction for image recording is input to the image recording apparatus 10. In response to input of this instruction, the controller 28 controls units such as the pairs of first rollers 22, the pairs of second rollers 24, the pairs of third rollers 26, and the like to move the sheet 2 along the path 100.

(Surface Treatment Step)

In the surface treatment step, the controller 28 controls the surface treatment device 30 to provide surface treatment to the sheet 2. The controller 28 controls the surface treatment device 30 to generate corona discharge, and the sheet 2 is exposed to the corona discharge while passing under the surface treatment device 30, thereby providing surface treatment to the sheet 2. Consequently, the quality of the surface of the sheet 2 is modified and the wettability of the print side thereof is improved. The surface treatment step may not be performed.

(Ejection Step)

In the ejection step, the controller 28 controls the head 32 to eject the ink onto the surface of the sheet 2 while it is moving along the path 100. The controller 28 controls the piezoelectric elements (not shown) corresponding to the respective nozzles 33 and the like such that the ink is ejected selectively from the nozzles 33 toward the sheet 2 while the sheet 2 is passing under the head 32. Consequently, an image is recorded on the surface of the sheet 2.

(Drying Step)

In the drying step, the controller 28 controls the drying device 34 to dry the ink by heating the ink-adhering sheet 2. The controller 28 controls the drying device 34, which is for example a dryer, to blow hot air with a predetermined temperature to the sheet 2. The ink on the sheet 2 is thereby dried while the sheet 2 is passing under the drying device 34. The predetermined temperature is not particularly limited, and it may be, for example, equal to or higher than the glass transition temperature of the resin particles contained in the ink. Generally, when the ink-adhering sheet 2 is heated to a temperature higher than the glass transition temperature of the resin particles, the resin particles in the ink experience glass transition. Then, once the temperature of the sheet 2 decreases to a temperature lower than the glass transition temperature, the glass-transitioned resin particles solidify. This improves the rub fastness of the image recorded on the sheet 2. To facilitate the above effects, the above-mentioned predetermined temperature may be in a range of the glass transition temperature+10° C. or more to 110° C. or less. How long each portion of the sheet 2 should be dried is not particularly limited, but to facilitate formation of a superior coating film, it may be, for example, in a range of 20 seconds or more to 600 seconds or less.

(Pressure Application Step)

In the pressure application step, the controller 28 controls relevant unit(s) to apply a predetermined pressure to the sheet 2 with the image recorded thereon. For example, the controller 28 adjusts the nipping force of the pairs of third rollers 26 and the rotation speed of the second holder 16 to control tension applied to the sheet 2 while the sheet 2 is rolled on the second roll 6. The controller 28 thus controls the relevant units to apply a predetermined pressure to the sheet 2 rolled on the second roll 6. For example, the sheet 2 is rolled on the second roll 6 with a pressure of 40 kPa or more and 100 kPa or less applied thereto. The application of the predetermined pressure to the sheet 2 with the image recorded thereon improves smoothness of the image. How to apply a pressure to the sheet 2 is not limited to the method described above. For example, a pressure may be applied to the sheet 2 by using a device that presses the sheet 2 on a table with a cylinder or the like. Alternatively, a pressure may not be applied to the sheet 2.

In case of using a device that applies a pressure to the sheet 2, a pressing member of this device configured to apply a pressure (e.g., a cylinder) may have a relatively rough surface. In this case, when a pressure is applied to the sheet 2 using this device, the rough surface of the pressing member may adversely affect the surface of the image. As a result, the developed area ratio Sdr of the coating film may be increased on its contact surface with the pressing member. By contrast, in this embodiment, a pressure is applied to the sheet 2 while the sheet 2 is being rolled. That is, the pressure is applied to the sheet 2 with portions of the sheet 2 layered on each other. Since the arithmetic mean height Sa1 of the sheet 2 is relatively small as described above, the pressure can be applied without giving much influence on the shape of image surface that contacts the sheet 2. This allows for favorable formation of a coating film having a smaller developed area ratio Sdr.

In the inkjet recording method, each of the above steps is performed such that the following condition (a) is satisfied: (a) in a case where a ratio of the amount of ejected ink in the ejection step to the amount of remaining ink after the drying step is 1:0.05 to 0.15, the developed area ratio Sdr is 6% or less in 80% or more of a plurality of partial regions randomly selected from the ink adhering region on the surface of the sheet 2 when the amount of ejected ink is 1 mg/cm$^2$. That is, in the inkjet recording method, the composition of the ink, the ejection amount of ink per unit area of the sheet 2, the drying temperature and time for the ink-adhering sheet 2, the pressure applied to the sheet 2, and the like are adjusted as desired to the extent that the above condition (a) is satisfied. This allows for formation of a coating film having a smaller developed area ratio on the highly smooth sheet 2 and thus allows for recording of the image with superior rub fastness. In other words, a printed medium on which the image with superior rub fastness has been recorded can be provided to a user.

As described above, the inkjet recording method allows for formation of a coating film having a smaller developed area ratio. That is, the formed coating film is substantially as smooth as the sheet 2. Thus, the recorded image has superior glossiness.

In the inkjet recording method, each of the above steps may be performed such that the following condition (b) is satisfied in addition to the condition (a): (b) in the case where the ratio of the amount of ejected ink in the ejection step to the amount of remaining ink after the drying step is 1:0.05 to 0.15, an arithmetic mean height Sa2 is 8 nm or less in 80% or more of a plurality of partial regions randomly selected from the ink adhering region when the amount of ejected ink is 1 mg/cm$^2$.

In the inkjet recording method, each of the above steps may be performed such that the following condition (c) is satisfied in addition to the condition (a): (c) in the case where the ratio of the amount of ejected ink in the ejection step to the amount of remaining ink after the drying step is 1:0.05 to 0.15, a root mean square roughness Rq is 10 nm or less in 80% or more of a plurality of partial regions randomly selected from the ink adhering region when the amount of ejected ink is 1 mg/cm$^2$.

Performing each of the above steps such that the above condition (b) and/or condition (c) are/is satisfied allows for recording of the image with more superior rub fastness and glossiness. In other words, a printed medium on which the image with more superior rub fastness and glossiness has been recorded can be provided to the user. Satisfying the above condition (b) and/or condition (c) is not necessarily essential, and one or both of the conditions (b) and (c) may not be satisfied.

EXAMPLES

The ink is described in more detail referring to examples and comparative examples. It should be noted that the present disclosure may include but not limited to these examples.

(Preparation of Inks)

The components shown in Tables 1 to 3 were mixed to prepare inks for the examples and comparative examples. The numerical values of each component shown in the tables indicate the contents of the component relative to the overall amounts of the inks in units of mass %. The tables show the contents of resin particles in terms of solid content.

TABLE 1

| | Material Name | Example1 | Example2 | Example3 | Example4 | Example5 | Example6 | Example7 | Example8 | Example9 | Example10 | Example11 |
|---|---|---|---|---|---|---|---|---|---|---|---|---|
| (A) Resin Particles | Mowinyl 6969D (Tg = 71° C.) | 10.0 | 10.0 | 10.0 | 10.0 | 10.0 | 10.0 | 10.0 | 10.0 | 10.0 | 11.0 | 10.0 |
| | Take lac W-5661 (Tg = 70° C.) | — | — | — | — | — | — | — | — | — | — | — |
| | KT-8803 (Tg = 65° C.) | — | — | — | — | — | — | — | — | — | — | — |
| | PESRESIN A-647GEX (Tg = 60° C.) | — | — | — | — | — | — | — | — | — | — | — |
| | Mowinyl 6899D (Tg = 49° C.) | — | — | — | — | — | — | — | — | — | — | — |
| | Take lac W-6061 (Tg = 25° C.) | — | — | — | — | — | — | — | — | — | — | — |
| | Mowinyl 6775 (Tg = 5° C.) | — | — | — | — | — | — | — | — | — | — | — |
| | Mowinyl 6751D (Tg = −32° C.) | — | — | — | — | — | — | — | — | — | — | — |
| (B) Organic Solvent | Tripropylene Glycol (Vapor Pressure at 25° C.: 140 Pa) | — | — | — | 0.5 | 0.5 | 10.0 | — | 0.5 | 1.0 | 1.0 | 10.0 |
| | Triethylene Glycol Monobutyl Ether (Vapor Pressure at 25° C.: 0.33 Pa) | — | — | — | — | — | — | 10.0 | — | — | — | — |
| | Dipropylene Glycol (Vapor Pressure at 25° C.: 4 Pa) | — | — | — | — | — | — | — | — | — | — | — |
| | Propylene Glycol (Vapor Pressure at 25° C.: 187 Pa) | 0.5 | 0.5 | 0.5 | — | — | — | — | — | — | — | — |
| Surfactant | SILFACE 503A | 1.0 | 1.0 | 1.0 | 1.0 | 1.0 | 1.0 | 1.0 | 1.0 | 1.0 | 1.0 | 1.0 |
| | OLFINE E1004 | — | — | — | — | — | — | — | — | — | — | — |
| Water | Ultrapure Water | Remainder | Remainder | Remainder | Remainder | Remainder | Remainder | Remainder | Remainder | Remainder | Remainder | Remainder |
| HSP Distance between Component | | 10.9 | 10.9 | 10.9 | 3.2 | 3.2 | 3.2 | 3.4 | 3.2 | 3.2 | 3.2 | 3.2 |
| Medium(A) and Component (B) | | PVC | PVC | PVC | PVC | PVC | PVC | PVC | PVC | PVC | PVC | PVC |
| Arithmetic Mean Height Sa1 [nm ] | | 5 | 5 | 5 | 5 | 5 | 5 | 5 | 5 | 5 | 5 | 5 |

TABLE 2

| | Material Name | Example12 | Example13 | Example14 | Example15 | Example16 | Example17 | Example18 | Example19 | Example20 | Example21 |
|---|---|---|---|---|---|---|---|---|---|---|---|
| (A) Resin Particles | Mowinyl 6969D (Tg = 71° C.) | — | — | — | — | 10.0 | 8.0 | — | — | 10.0 | 10.0 |
| | Take lac W-5661 (Tg = 70° C.) | 10.0 | — | — | — | — | — | — | 9.0 | — | — |
| | KT-8803 (Tg = 65° C.) | — | 10.0 | — | — | — | — | 7.0 | — | — | — |
| | PESRESIN A-647GEX (Tg = 60° C.) | — | — | 5.0 | 5.0 | — | — | — | — | — | — |
| | Mowinyl 6899D (Tg = 49° C.) | — | — | — | — | — | — | — | — | — | — |

TABLE 2-continued

| | Material Name | Example12 | Example13 | Example14 | Example15 | Example16 | Example17 | Example18 | Example19 | Example20 | Example21 |
|---|---|---|---|---|---|---|---|---|---|---|---|
| | Take lac W-6061 (Tg = 25° C.) | — | — | — | — | — | — | — | — | — | — |
| | Mowinyl 6775 (Tg = 5° C.) | — | — | — | — | — | — | — | — | — | — |
| | Mowinyl 6751D (Tg = −32° C.) | — | — | — | — | — | — | — | — | — | — |
| (B) Organic Solvent | Tripropylene Glycol (Vapor Pressure at 25° C.: 140 Pa) | 10.0 | 10.0 | 5.0 | 5.0 | 0.5 | 7.0 | — | — | 0.5 | 0.5 |
| | Triethylene Glycol Monobutyl Ether (Vapor Pressure at 25° C.: 0.33 Pa) | — | — | — | — | — | — | 5.0 | — | — | — |
| | Dipropylene Glycol (Vapor Pressure at 25° C.: 4 Pa) | — | — | — | — | — | — | — | 6.0 | — | — |
| | Propylene Glycol (Vapor Pressure at25° C.: 187 Pa) | — | — | — | — | — | — | — | — | — | — |
| Surfactant | SILFACE 503A | 1.0 | 1.0 | 1.0 | 1.0 | 1.0 | 1.0 | 1.0 | 1.0 | 1.0 | 1.0 |
| | OLFINE E1004 | — | — | — | — | — | — | — | — | — | — |
| Water | Ultrapure Water | Remainder | Remainder | Remainder | Remainder | Remainder | Remainder | Remainder | Remainder | Remainder | Remainder |
| HSP Distance between Component (A) and Component (B) | | 3.5 | 3.2 | 3.3 | 3.3 | 3.2 | 3.2 | 1.5 | 2.1 | 3.2 | 3.2 |
| Medium | | PVC | PVC | PET | PET | PVC | PVC | PVC | PET | PVC | PVC |
| Arithmetic Mean Height Sa1 [nm ] | | 5 | 5 | 4 | 4 | 5 | 5 | 5 | 4 | 5 | 5 |

TABLE 3

| | Material Name | Comparative Example1 | Comparative Example2 | Comparative Example3 | Comparative Example4 | Comparative Example5 | Comparative Example6 | Comparative Example7 | Comparative Example8 | Comparative Example9 | Comparative Example10 |
|---|---|---|---|---|---|---|---|---|---|---|---|
| (A) Resin Particles | Mowinyl 6969D (Tg = 71° C.) | 10.0 | 10.0 | 10.0 | 3.0 | 12.0 | — | — | — | — | — |
| | Take lac W-5661 (Tg = 70° C.) | — | — | — | — | — | — | — | — | — | — |
| | KT-8803 (Tg = 65° C.) | — | — | — | — | — | — | — | — | — | — |
| | PESRESIN A-647GEX (Tg = 60° C.) | — | — | — | — | — | 5.0 | — | — | — | — |
| | Mowinyl 6899D (Tg = 49° C.) | — | — | — | — | — | — | 10.0 | — | — | — |
| | Take lac W-6061 (Tg = 25° C.) | — | — | — | — | — | — | — | 10.0 | — | — |
| | Mowinyl 6775 (Tg = 5° C.) | — | — | — | — | — | — | — | — | 10.0 | — |
| | Mowinyl 6751D (Tg = −32° C.) | — | — | — | — | — | — | — | — | — | 10.0 |
| (B) Organic Solvent | Tripropylene Glycol (Vapor Pressure at 25° C.: 140 Pa) | — | 0.5 | — | 1.0 | 1.0 | 5.0 | 10.0 | 10.0 | 10.0 | 10.0 |
| | Triethylene Glycol Monobutyl Ether (Vapor Pressure at 25° C.: 0.33 Pa) | — | — | — | — | — | — | — | — | — | — |
| | Dipropylene Glycol (Vapor Pressure at 25° C.: 4 Pa) | — | — | — | — | — | — | — | — | — | — |
| | Propylene Glycol (Vapor Pressure at 25° C.: 187 Pa) | — | — | 10.0 | — | — | — | — | — | — | — |
| Surfactant | SILFACE 503A | 1.0 | 1.0 | — | 1.0 | 1.0 | 1.0 | 1.0 | 1.0 | 1.0 | 1.0 |
| | OLFINE E1004 | — | — | 1.0 | — | — | — | — | — | — | — |
| Water | Ultrapure Water | Remainder | Remainder | Remainder | Remainder | Remainder | Remainder | Remainder | Remainder | Remainder | Remainder |
| HSP Distance between Component (A) and Component (B) | | — | 3.2 | 10.9 | 3.2 | 3.2 | 3.3 | 3.4 | 3.5 | 4.2 | 4.2 |
| Medium | | PVC | PVC | PVC | PVC | PVC | PP | PVC | PVC | PVC | PVC |
| Arithmetic Mean Height Sa1 [nm] | | 5 | 5 | 5 | 5 | 5 | 7 | 5 | 5 | 5 | 5 |

The prepared inks were evaluated for rub fastness of image-recorded area and image glossiness according to the method described below.

(Production of Evaluation Samples)

Drawdown was performed to the media (10 cm×10 cm) shown in Tables 1 to 3 such that the inks adhere in an amount of 1 mg/cm$^2$. Then, these media were dried by a constant temperature drying device (DX402 manufactured by Yamato Scientific Co., Ltd.) at the drying temperatures (heating temperatures) for the drying times (heating times) shown in Tables 4 to 6, respectively. These dried media were used as evaluation samples except for examples 16 to 21. For examples 16 to 21, evaluation samples were obtained by interposing each ink-adhering medium between flat SUS plates after dried and applying the pressures shown in Tables 4 to 6 thereto for 12 hours. The media shown in Tables 1 to 3 are as follows.

PET: single-phase general PET film 38 μm (manufactured by TOPPAN INC.)

PVC: PVC film for inkjet printing "BANDO GLANMESSE (registered trademark)" GM-H-EHG PP: OPP film 20 μm (manufactured by TOPPAN INC.)

(Measurement of Parameters of Media and Evaluation Samples)

For each evaluation sample, the medium surface roughness and image surface roughness were measured using an atomic force microscope (Dimension icon manufactured by Bruker Corporation) in a tapping mode (field 1 μm×1 μm). This measurement was conducted to ten portions randomly selected from an ink-adhering region of each evaluation sample. From the measured values, an arithmetic mean height Sa1 of the medium surface, a developed area ratio Sdr of the image surface to the medium surface, an arithmetic mean height Sa2 of the image surface, and a root mean square roughness Rq of the image surface in each of the ten portions were calculated. The results are shown in Tables 1 to 6. For example, Table 4 shows that regarding example 1, the developed area ratio Sdr of the image surface to the medium surface was 6% or less in 80% (i.e., in eight portions) of the ten portions and also shows that regarding example 11, the arithmetic mean height Sa2 of the image surface was 6 nm or less in 90% (i.e., in nine portions) of the ten portions. It should be noted that the tables show an average of the developed area ratios Sdr measured in the ten portions, an average of the arithmetic mean heights Sa2 measured in the ten portions, and an average of the root mean square roughnesses Rq measured in the ten portions for each of comparative examples 1 to 6.

(Rub Fastness Evaluation)

The image-recorded portion of each evaluation sample was rubbed 100 cycles under load of 500 g by a probe of a color fastness rubbing tester (AB-301 manufactured by TESTER SANGYO CO., LTD.). After the rubbing, the rub fastness of each sample was visually evaluated according to the grades below. The evaluation results are shown in Tables 4 to 6.

AAA: No scrapes

AA: Slightly scraped (scraped area of 5% or less)

A: Scraped (scraped area of more than 5% to 10% or less)

B: Scraped (scraped area of more than 10% to 20% or less)

C: Scraped (scraped area of more than 20%)

(Glossiness Evaluation)

The glossiness of each evaluation sample was measured at a measurement angle of 60 degrees by a gloss meter (HG-268 manufactured by Suga Test Instruments Co., Ltd.). Based on the measurement value of each sample, the glossiness of the recorded image was evaluated according to the grades below. The evaluation results are shown in Tables 4 to 6.

AA: 95 or more

A: 90 or more and less than 95

B: 85 or more and less than 90

C: less than 85

TABLE 4

| | | Example1 | Example2 | Example3 | Example4 | Example5 | Example6 | Example7 | Example8 | Example9 | Example10 | Example11 |
|---|---|---|---|---|---|---|---|---|---|---|---|---|
| Drying Temprature [° C.] | | 110 | 110 | 110 | 80 | 90 | 70 | 70 | 110 | 110 | 110 | 100 |
| Drying Time [min.] | | 30 | 60 | 600 | 60 | 60 | 60 | 60 | 60 | 60 | 60 | 60 |
| Pressure [kPa] | | — | — | — | — | — | — | — | — | — | — | — |
| Developed Area Ratio Sdr [%] | | 6 | 5 | 3 | 6 | 4 | 3 | 3 | 3 | 3 | 5 | 3 |
| Percentage of Area | | 80% | 80% | 90% | 80% | 80% | 80% | 80% | 80% | 80% | 80% | 90% |
| Arithmetic Mean Height Sa2 [nm] | | 8 | 7 | 6 | 8 | 7 | 7 | 8 | 7 | 6 | 8 | 6 |
| Percentage of Area | | 80% | 80% | 90% | 80% | 80% | 80% | 80% | 80% | 80% | 80% | 90% |
| Root Mean Square Roughness Rq [nm] | | 10 | 9 | 7 | 10 | 9 | 9 | 9 | 8 | 7 | 10 | 7 |
| Percentage of Area | | 80% | 80% | 90% | 80% | 80% | 80% | 80% | 80% | 80% | 80% | 90% |
| Evaluation | Rub Fastness | B | A | AA | B | A | A | A | A | A | A | AA |
| | Glossiness | A | A | A | A | A | A | A | A | A | B | A |

TABLE 5

| | | Example12 | Example13 | Example14 | Example15 | Example16 | Example17 | Example18 | Example19 | Example20 | Example21 |
|---|---|---|---|---|---|---|---|---|---|---|---|
| Drying Temprature [° C.] | | 100 | 100 | 90 | 110 | 110 | 110 | 100 | 110 | 110 | 110 |
| Drying Time [min.] | | 60 | 60 | 60 | 900 | 60 | 250 | 300 | 150 | 60 | 60 |
| Pressure [kPa] | | — | — | — | — | 40 | 100 | 80 | 70 | 20 | 150 |
| Developed Area Ratio Sdr [%] | | 3 | 3 | 4 | 5 | 3 | 2 | 2 | 1 | 3 | 3 |
| Percentage of Area | | 80% | 90% | 80% | 80% | 90% | 90% | 90% | 90% | 90% | 90% |
| Arithmetic Mean Height Sa2 [nm] | | 7 | 6 | 7 | 8 | 6 | 5 | 6 | 5 | 6 | 6 |
| Percentage of Area | | 80% | 90% | 80% | 80% | 90% | 90% | 90% | 90% | 80% | 90% |
| Root Mean Square Roughness Rq [nm] | | 8 | 7 | 9 | 10 | 7 | 7 | 6 | 5 | 7 | 8 |
| Percentage of Area | | 80% | 90% | 80% | 80% | 90% | 90% | 90% | 90% | 80% | 90% |
| Evaluation | Rub Fastness | A | AA | A | A | AA | AAA | AAA | AAA | AA | AA |
| | Glossiness | A | A | A | B | A | AA | AA | AA | A | A |

TABLE 6

| | | Comparative Example1 | Comparative Example2 | Comparative Example3 | Comparative Example4 | Comparative Example5 | Comparative Example6 | Comparative Example7 | Comparative Example8 | Comparative Example9 | Comparative Example10 |
|---|---|---|---|---|---|---|---|---|---|---|---|
| Drying Temprature [° C.] | | 110 | 110 | 70 | 110 | 110 | 90 | 100 | 100 | 100 | 100 |
| Drying Time [min.] | | 10 | 10 | 60 | 60 | 60 | 6 0 | 60 | 60 | 60 | 60 |
| Pressure [kPa] | | — | — | — | — | — | — | — | — | — | — |
| Developed Area Ratio Sdr [%] | | 8 | 8 | 19 | 7 | 8 | 10 | 3 | 2 | 3 | 3 |
| Percentage of Area | | — | — | — | — | — | — | 80% | 90% | 80% | 80% |
| Arithmetic Mean Height Sa2 [nm] | | 10 | 9 | ≥20 | 9 | 11 | 11 | 7 | 6 | 7 | 6 |
| Percentage of Area | | — | — | — | — | — | — | 80% | 80% | 80% | 80% |
| Root Mean Square Roughness Rq [nm] | | 13 | 12 | ≥20 | 12 | 14 | 15 | 1 | 7 | 8 | 7 |
| Percentage ofArea | | — | — | — | — | — | — | 80% | 80% | 80% | 80% |
| Evaluation | Rub Fastness | C | C | C | C | A | C | C | C | C | C |
| | Glossiness | C | C | C | C | C | C | A | A | A | A |

As shown in Tables 4 to 6, examples 1 to 21 showed generally good results for the rub fastness and glossiness evaluations.

In contrast, comparative examples 1 to 6 each showed larger values for all of the developed area ratio Sdr, the arithmetic mean height Sa2, and the root mean square roughness Rq, compared to the examples. Specifically, in each of the examples 1 to 21, Sdr is 6% or less, Sa2 is 8 nm or less, and Rq is 10 nm or less in 80% or more of the ten portions, whereas in each of comparative examples 1 to 6, the averages of values of these parameters are larger and thus their evaluation results for rub fastness and glossiness are inferior. From this, it has been found that recording images under conditions that satisfy the values of the examples provides superior rub fastness and glossiness to the recorded images.

The ink used in comparative example 1 did not comprise any organic solvents. This may have made it harder for the resin particles in the ink to melt and caused insufficient formation of a coating film due to a large part of the resin particles remaining in the form of particles, resulting in the low smoothness and inferior rub fastness and glossiness. From this, it has been found that organic solvents contribute to favorable formation of coating film.

In each of comparative examples 1 and 2, the drying time was relatively short. This may have caused insufficient drying of the inks, resulting in the inferior rub fastness and glossiness. From this, it has been found that it is necessary to sufficiently dry the inks to form highly smooth coating films.

In comparative example 3, the drying temperature was slightly lower, which was a temperature (70° C.) near the glass transition temperature Tg of the resin particles. This may have hindered favorable melting progression of the resin particles, resulting in the low smoothness of the coating film. Further, in comparative example 3, the organic solvent in the ink had a higher vapor pressure and the HSP distance between the organic solvent and the resin particles was larger, which means the resin particles were less likely to dissolve in the organic solvent. This may have caused the organic solvent to vaporize before the resin particles completely dissolved in the organic solvent, also resulting in the lower smoothness of the coating film. From this, it has been found that physical properties of a formed coating film depend on the ink drying temperature and kind of organic solvent used.

Comparative examples 4 and 5 are identical to examples 9 and 10 except for their contents of resin particles. Specifically, the content of resin particles in comparative example 4 (3 mass %) is less than the contents of resin particles in examples 9 and 10, and the content of resin particles in comparative example 5 (12 mass %) is more than the contents of resin particles in examples 9 and 10. In comparative example 4, the less content of resin particles may have caused insufficient formation of a coating film on the medium surface, resulting in the inferior rub fastness and glossiness. In contrast, in comparative example 5, the more content of resin particles may have leaded to the superior result for rub fastness but degraded the smoothness of the coating film, resulting in the inferior glossiness. From this, it has been confirmed that the inclusion of resin particles in a moderate amount allows for favorable formation of a coating film.

Comparative example 6 is identical to example 14 except for the difference in medium. In comparative example 6, the arithmetic mean height Sa1 of the medium surface was larger. This may have caused formation of a coating film on the relatively less smooth medium, resulting in the inferior value of developed area ratio Sdr and thus the inferior rub fastness and glossiness. From this, it has been found that physical properties of a formed coating film also depend on the kind of medium.

Comparative examples 7 to 10 each show a good result for glossiness but an inferior result for rub fastness. Comparative examples 7 to 10 are identical to examples 11 to 13 except for the difference in glass transition temperature Tg of resin particles. Specifically, the glass transition temperatures Tg of the resin particles used in comparative examples 7 to 10 are lower than those of the resin particles used in examples 11 to 13. From this, it has been found that resin particles with lower glass transition temperatures Tg cannot provide favorable strength to coating films after drying of ink, resulting in inferior rub fastness.

In comparison between the examples, examples 1 to 3 are identical to each other except for the difference in drying time. From the comparison between examples 1 to 3, it has been found that the values of Sdr, Sa2, and Rq decrease with longer drying time and rub fastness is accordingly improved. However, as shown in example 15, excessively long drying time tends to degrade glossiness.

The drying temperature for the examples 6 and 7 is slightly lower than those for the other examples. Specifically, the drying temperature for the examples 6 and 7 is near the glass transition temperature of the resin particles. Even so, they show good evaluation results. From this, it has been found that as long as an ink comprises resin particles and an organic solvent having a favorable HSP distance and vapor pressure, good results may be obtained for rub fastness and glossiness even when a drying temperature for the ink is near the glass transition temperature of the resin particles. Examples 4, 5, and 8 are identical to each other except for the difference in drying temperature. From the comparison between these examples, it has been found that higher drying temperatures lead to decreased values of Sdr, Sa2, and Rq, allowing for more favorable formation of a coating film.

Examples 16 to 21 show particularly superior results for rub fastness and glossiness. In these examples 16 to 21, pressures were applied to the samples after the drying of inks. Thus, it has been found that the application of pressures to recorded images brings better results. In example 20, however, the relatively small pressure applied may have not smoothened the coating film as sufficiently as examples 16 to 19, resulting in the grade A for glossiness. In example 21, the relatively large pressure applied may have favorably smoothened the coating film but caused deformation of the medium, resulting in the grade A for glossiness. From this, it has been found that more favorable coating films can be formed by adjusting pressure to be applied.

As described, formation of a coating film with resin particles is affected by multiple factors such as drying temperature, drying time, presence/absence of an organic solvent, properties of organic solvent, pressure to be applied, and the like. Conventionally, conditions for the respective factors were considered to achieve coating films with desired rub fastness and glossiness, but the consideration was difficult especially when multiple factors were involved. In view of this, the inventor paid attention to a coating film being formed by resin particles experiencing form change from particles to film under the influence of the above-mentioned factors, and came up with an idea that capturing the form change would facilitate directly finding properties of the resulting coating film. Then, as described in the embodiment above, defining values of a developed area ratio Sdr of a coating film and the like allows for formation of a coating film with desired rub fastness and glossiness.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An inkjet recording method, comprising:

ejecting ink onto a surface of a medium under a first condition; and drying the ink by heating the medium under a second condition after the ejecting, wherein an arithmetic mean height Sa1 is 5 nm or less in 80% or more of a plurality of first partial regions randomly selected from the surface of the medium, the first condition includes:

(1) using the ink that comprises resin particles having a glass transition temperature Tg of 50° C. or higher, an organic solvent, and water, wherein the ink comprises the resin particles in 5 mass % or more and 11 mass % or less, and the first condition and the second condition are conditions that satisfy:

(2) in a case where a ratio of an amount of ejected ink to an amount of remaining ink after the drying is 1:0.05 to 0.15, a developed area ratio Sdr is 6% or less in 80% or more of a plurality of second partial regions randomly selected from an ink adhering region on the surface of the medium when the amount of ejected ink is 1 $mg/cm^2$.

2. The inkjet recording method according to claim 1, wherein the first condition and the second condition are conditions that further satisfy:

(3) in the case where the ratio of the amount of ejected ink to the amount of remaining ink after the drying is 1:0.05 to 0.15, an arithmetic mean height Sa2 is 8 nm or less in 80% or more of a plurality of third partial regions randomly selected from the ink adhering region when the amount of ejected ink is 1 $mg/cm^2$.

3. The inkjet recording method according to claim 1, wherein the first condition and the second condition are conditions that further satisfy:

(4) in the case where the ratio of the amount of ejected ink to the amount of remaining ink after the drying is 1:0.05 to 0.15, a root mean square roughness Rq is 10 nm or less in 80% or more of a plurality of fourth partial regions randomly selected from the ink adhering region when the amount of ejected ink is 1 $mg/cm^2$.

4. The inkjet recording method according to claim 1, wherein the first condition further includes:

(5) using the ink comprising the organic solvent in 0.5 mass % or more and 10 mass % or less, wherein the organic solvent has a Hansen solubility parameter distance of 1 or more and 5 or less between the organic solvent and the resin particles in a three-dimensional space represented by the Hansen solubility parameter and has a vapor pressure of 150 Pa or less at 25° C.

5. The inkjet recording method according to claim 1, wherein the second condition includes:

(6) a heating temperature is from (the Tg+10° C.) or more to 110° C. or less, and a heating time is from 20 seconds or more to 600 seconds or less.

6. The inkjet recording method according to claim 1, further comprising:

applying a pressure of 40 kPa or more and 100 kPa or less to the medium after the drying.

7. The inkjet recording method according to claim 6, wherein the pressure is applied to the medium by rolling the medium.

8. The inkjet recording method according to claim 1, wherein the first condition further includes:

using the ink that comprises resin particles having a glass transition temperature Tg of 65° C. or higher, an organic solvent, and water, wherein the ink comprises the resin particles in 7 mass % or more and 9 mass % or less.

9. The inkjet recording method according to claim 1, wherein the first condition and the second condition are conditions that further satisfy:

in a case where a ratio of an amount of ejected ink to an amount of remaining ink after the drying is 1:0.05 to 0.15, a developed area ratio Sdr is 2% or less in 80% or more of a plurality of second partial regions randomly selected from an ink adhering region on the surface of the medium when the amount of ejected ink is 1 $mg/cm^2$.

10. The inkjet recording method according to claim 3, wherein the first condition and the second condition are conditions that further satisfy:

in the case where the ratio of the amount of ejected ink to the amount of remaining ink after the drying is 1:0.05 to 0.15, a root mean square roughness Rq is 5 nm or more and 7 nm or less in 80% or more of a plurality of fourth partial regions randomly selected from the ink adhering region when the amount of ejected ink is 1 $mg/cm^2$.

11. The inkjet recording method according to claim 4, wherein the first condition further includes:

using the ink comprising the organic solvent in 5.0 mass % or more and 7.0 mass % or less, wherein the organic solvent has a Hansen solubility parameter distance of 1.5 or more and 3.2 or less between the organic solvent and the resin particles in a three-dimensional space represented by the Hansen solubility parameter and has a vapor pressure of 150 Pa or less at 25° C.

12. A printed medium obtained by ejecting ink onto a surface of a medium, wherein in the printed medium:

(1) an arithmetic mean height Sa1 is 5 nm or less in 80% or more of a plurality of first partial regions randomly selected from a non-ink-adhering region on the surface of the medium; and (2) a developed area ratio Sdr is 6% or less in 80% or more of a plurality of second partial regions randomly selected from an ink adhering region on the surface of the medium when an amount of ejected ink is 1 $mg/cm^2$.

13. The printed medium according to claim 12, wherein (3) an arithmetic mean height Sa2 is 8 nm or less in 80% or more of a plurality of third partial regions randomly selected from the ink adhering region when an amount of ejected ink is 1 $mg/cm^2$.

14. The printed medium according to claim 12, wherein (4) a root mean square roughness Rq is 10 nm or less in 80% or more of a plurality of fourth partial regions randomly selected from the ink adhering region when an amount of ejected ink is 1 $mg/cm^2$.

* * * * *